(12) United States Patent
Srikrishnan et al.

(10) Patent No.: US 8,335,348 B2
(45) Date of Patent: Dec. 18, 2012

(54) VISUAL OBJECT TRACKING WITH SCALE AND ORIENTATION ADAPTATION

(75) Inventors: V. Srikrishnan, Mumbai (IN); Tadinada Nagaraj, Mumbai (IN); Subhasis Chaudhuri, Mumbai (IN)

(73) Assignee: Indian Institute of Technology Bombay, Mumbai (IN)

( * ) Notice: Subject to any disclaimer, the term of this patent is extended or adjusted under 35 U.S.C. 154(b) by 478 days.

(21) Appl. No.: 12/637,180

(22) Filed: Dec. 14, 2009

(65) Prior Publication Data

US 2011/0142282 A1    Jun. 16, 2011

(51) Int. Cl.
*G06K 9/00*    (2006.01)
(52) U.S. Cl. ........................................ 382/103; 382/286
(58) Field of Classification Search .................. 382/103, 382/107, 286, 289, 291
See application file for complete search history.

(56) References Cited

U.S. PATENT DOCUMENTS

| | | | |
|---|---|---|---|
| 6,674,877 B1 * | 1/2004 | Jojic et al. | 382/103 |
| 7,200,266 B2 * | 4/2007 | Ozer et al. | 382/173 |
| 2008/0262772 A1 * | 10/2008 | Luinge et al. | 702/94 |

OTHER PUBLICATIONS

Yilmaz, A., "Object Tracking by Asymmetric Kernel Mean Shift with Automatic Scale and Orientation Selection" in IEEE Conf. on Computer Vision and Pattern Recognition, 2007, Jun. 17-22, 2007, pp. 1-6.
Srikrishnan, V., Nagaraj, T. and Chaudhuri, Subhasis, "Fragment Based Tracking for Scale and Orientation Adaptation", 6th Indian Conference on Computer Vision, Graphics & Image Processing, Bhubaneswar, Dec. 2008, ICVGIP '08, pp. 2-8.

* cited by examiner

*Primary Examiner* — Andrew W Johns
(74) *Attorney, Agent, or Firm* — Brundidge & Stanger, P.C.

(57) ABSTRACT

A method of tracking an object that appears in a plurality of image frames is provided. The method includes (a) dividing an identified object of one of the plurality of image frames into a plurality of object segments and (b) tracking a location of each of the plurality of object segments in the image frame. The method also includes (c) estimating at least one of scale and orientation of the object using the location of each of the plurality of object segments and (d) obtaining position of the object using the estimated scale and orientation.

20 Claims, 4 Drawing Sheets

VISUAL OBJECT TRACKING WITH SCALE AND ORIENTATION ADAPTATION

BACKGROUND

Visual object tracking is required in a variety of applications such as remote sensing, security, surveillance and monitoring, and military target detection. Typically, tracking of objects in video applications may be performed using blob, feature or contour based methods. Contour based methods provide details regarding boundaries of the object. However, such methods may require substantially high processing time for providing such information.

Certain applications employ blob based methods to track objects in video applications. In operation, blob based methods track the objects using geometric shapes such as a rectangle or an ellipse enclosing the object. One way of tracking objects using blobs is by using a mean shift tracker that models the object in different frames of a video application through histograms. Further, the position of the object is determined by comparing the histograms in different frames. Unfortunately, such trackers may not be able to handle scale and orientation changes of the object in the image frames.

Another way of tracking objects is by detection and trajectory estimation methods. However, such methods may be specific for particular objects and may require substantial offline training for generating a set of features for the objects. In addition, such techniques may require frequent updating of the set of features.

SUMMARY

The foregoing summary is illustrative only and is not intended to be in any way limiting. In addition to the illustrative aspects, embodiments, and features described above, further aspects, embodiments, and features will become apparent by reference to the drawings and the following detailed description.

Briefly, in accordance with one aspect, a method of tracking an object that appears in a plurality of image frames is provided. The method includes (a) dividing an identified object of one of the plurality of image frames into a plurality of object segments and (b) tracking a location of each of the plurality of object segments in the image frame. The method also includes (c) estimating at least one of scale and orientation of the object using the location of each of the plurality of object segments and (d) obtaining position of the object using the estimated scale and orientation.

In accordance with another aspect, a method of tracking an object that appears in a plurality of image frames is provided. The method includes identifying the object in one of the plurality of image frames, dividing the identified object into a plurality of object segments and estimating a location of each of the plurality of object segments using a mean shift vector of each of the plurality of object segments. The method also includes updating the estimated location of each of the plurality of object segments through a Kalman filter and estimating at least one of scale and orientation of the object using the updated location of each of the plurality of object segments.

In accordance with another aspect, a system for tracking an object is provided. The system includes a memory configured to store a plurality of image frames with at least one object appearing in each of the plurality of image frames and an image processing circuit configured to estimate a scale and an orientation of the at least one object in each of the plurality of image frames. The image processing circuit comprises a plurality of tracking modules configured to track a position of each of a plurality of object segments of the at least one object and a computational module configured to estimate the scale and orientation of the at least one object using the position of each of the plurality of object segments.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Example embodiments are generally directed to visual object tracking. Such techniques may be useful in tracking of objects appearing in multiple frames of a video. Such analysis is required in a variety of applications such as remote sensing, and security, and surveillance applications.

Figure 1:
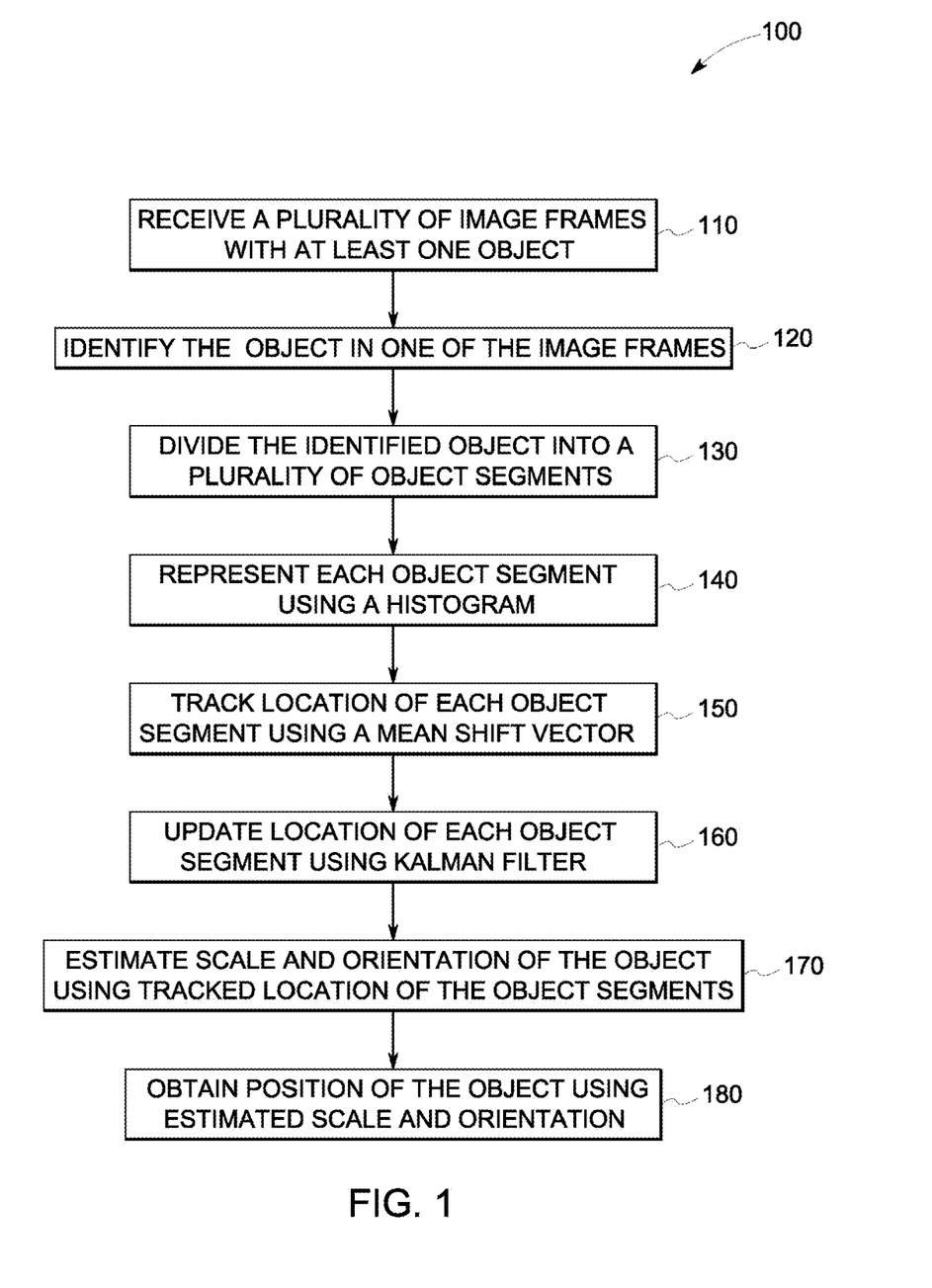
FIG. 1 is an example flow diagram of an embodiment of a method of tracking an object.

Referring now to FIG. 1, an example flow diagram 100 of an embodiment of a method of tracking an object is illustrated. At block 110, a plurality of image frames with at least one object are received. In this embodiment, the at least one object appears in each of the plurality of image frames. The object may have different scale and/or orientation in each of the plurality of image frames. The plurality of image frames may be obtained using a camera such as a video camera and such image frames may be stored for analysis and tracking of the at least one object. In certain embodiments, the image frames may include computer generated frame sequences (e.g. in animation films), obtained as a sequence of frames obtained by a still camera, a telescope, or other suitable imaging devices.

At block 120, the object is identified in one of the plurality of image frames. In one embodiment, the object is identified manually by a user. In another embodiment, the object is identified automatically using an object detection technique. The identified object is divided into a plurality of object segments (block 130). In an example embodiment, the identified object is divided into a plurality of overlapping object segments to maintain coherence between adjacent object segments.

At block 140, each of the object segments is represented using a histogram. In one example embodiment, each of the object segments is represented using a weighted histogram. The weights of the weighted histogram are obtained using a kernel that assigns relatively higher weights to pixels located at or near the center of an object segment as compared to pixels located near boundaries of the object segment. In certain other embodiments, each of the object segments is represented using an unweighted histogram. In this example embodiment, the center of the object segment is represented by $x_i=(x_i, y_i)$ and the center of the object is denoted by X. The dimensions of the object are denoted by $(W_T, H_T)$ and the dimensions of the object segments are denoted by $(W_F, H_F)$ respectively.

At block 150, location of each of the object segments is tracked using a mean shift vector. In certain embodiments, visual features of each of the plurality of object segments are characterized through a statistical distribution in each of the plurality of image frames. Further, a similarity coefficient is computed for each of the plurality of object segments in successive image frames with the object segments. In certain embodiments, the object may be tracked using image frames having some object segments missing in such image frames. The similarity coefficient for each object segment is utilized to obtain the location of the respective object segment. The visual features of the object segments may include a color and/or texture of the object segments.

In this example embodiment, the visual feature of interest (u) is RGB color space of the object and a model histogram having M bins is represented by the following relationship:

$$p_m(u) = C \sum k\left(\left\|\frac{x_i}{h}\right\|^2\right)\delta[I(x_i) - u], \quad (1)$$
$$u = 1 \ldots M$$

Where:
I is the image;
C is a normalizing constant;
k( ) is a kernel function; and
h is a band width of the kernel.

In this example embodiment, the kernel function includes Epanechnikov kernel. The tracking of each object segment is performed by using the convergence in previous image frame as the initialization in the current image frame and minimizing a distance between corresponding histograms of each of the object segments in the previous and current image frames. In this example embodiment, a mean shift vector is obtained with a kernel G as an estimate of the normalized density gradient obtained with a kernel K and is represented by the following relationship:

$$M_{h,g}(x) = \frac{h^2}{2/C} \frac{\nabla f_K(x)}{f_G(x)} \quad (2)$$

Where: f(x) is a density estimate with the kernel k(x) and the band width h.

The mean shift vector is utilized to derive location of the object segments in each of the image frames and to update the distribution of the feature of interest in such frames. Further, distance between the distributions of the feature between successive image frames is minimized to obtain the location of each of the plurality of object segments.

At block 160, the location of each of the plurality of object segments is updated using a Kalman filter. In this embodiment, a constant velocity Kalman filter is employed to maintain coherence between the object segments. In certain other embodiments, a constant position or a constant acceleration Kalman filter may be employed. The constant velocity Kalman filter is configured to substantially prevent drifting of the object segments. The state vector X for the constant velocity Kalman filter is represented by the following relationship:

$$X=\{x_1, x_2, \ldots x_N, \dot{x}_1, \dot{x}_2, \ldots \dot{x}_N\} \quad (3)$$

Where: N is the number of object segments that the object is divided into.

Moreover, a state transition model of the Kalman filter is represented by the following relationship:

$$X_{t+1}=FX_t+w_t \quad (4)$$

Where: F is the state transition matrix; and
$w_t$ is the randomness in the motion.

In this example embodiment, the random vector w, follows a Gaussian distribution with zero mean and covariance matrix $Q_t$. The state transition matrix F and the noise covariance matrix Q facilitate spatial proximity between adjacent object segments to maintain coherence between the object segments. In this embodiment, each of the state transition matrix F and the noise covariance matrix Q include a non diagonal matrix. In particular, diagonal elements of a state transition matrix Kalman filter are assigned a weight (w) and diagonal elements of the covariance matrix of the Kalman filter are assigned a weight $(1-w)/(N-1)$, wherein the weight (w) has a value between 0 and about 1. In one example embodiment, the weight has a value of 0.95.

The locations of the object segments after the mean shift iterations constitute the measurements for the Kalman filter and the measurement model is represented by the following equation:

$$Y_t=X_t+v_t \quad (5)$$

Where: $v_t$ represents additive white Gaussian noise with zero mean and covariance R.

In certain embodiments, the Kalman filter is employed to identify outlier object segments and in-lying object segments based upon the updated location of each of the object segments in successive image frames and a pre-determined threshold. At block 170, the scale and orientation of the object are estimated using the location of the in-lying object segments. In particular, a blob is generated for enclosing the in-lying object segments and centralized image moments are computed for the blob representing the object. Moreover, a centroid and covariance matrix is computed using the centralized image moments. The computed centroid and covariance matrix are utilized to determine the scale and orientation of the object and to obtain the position of the object (block 180).

Figure 2:
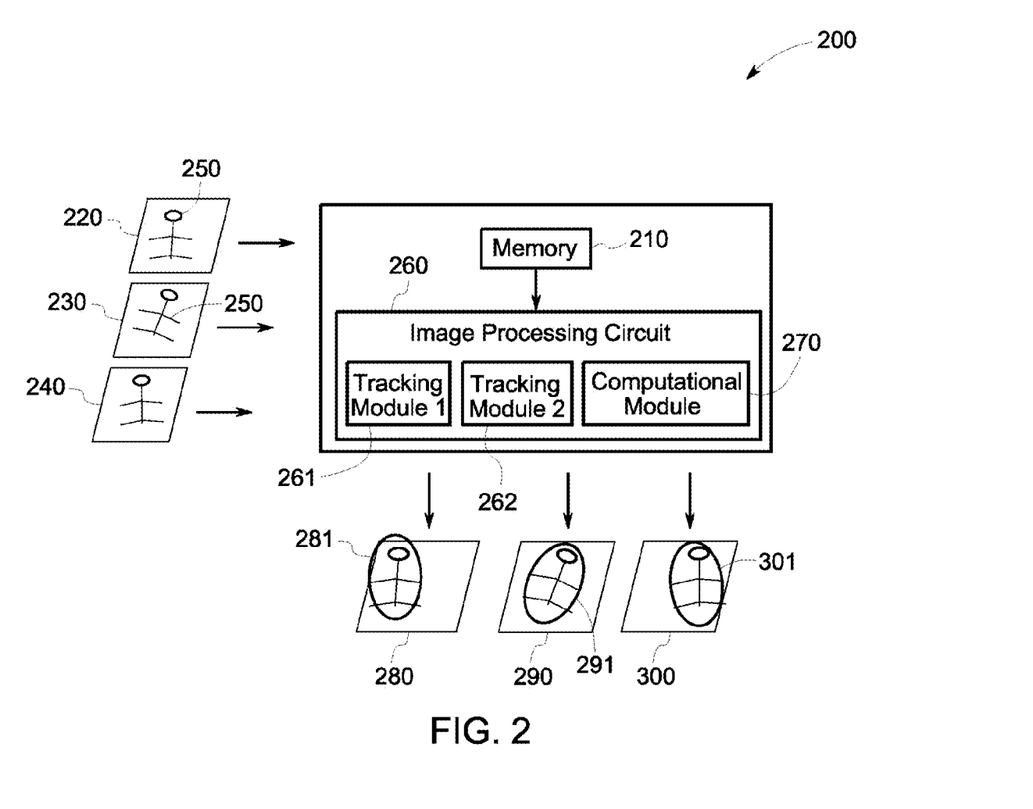
FIG. 2 is an illustrative embodiment of an object tracking system.

FIG. 2 illustrates an example object tracking system 200. The image object tracking system 200 includes a memory 210 configured to store a plurality of image frames such as represented by reference numerals 220, 230 and 240 with at least one object 250 appearing in each of the image frames 220, 230 and 240. The image frames 220, 230 and 240 may be obtained using any suitable image capture device (not shown) such as a video camera or may be generated by other means. Further, the image frames 220, 230 and 240 may be stored in the memory 210 for object tracking purposes. In the illustrated embodiment, the object 250 undergoes scale and orientation change as the object 250 is tracked through the image frames 220, 230 and 240 respectively.

The memory 210 may include hard disk drives, optical drives, tape drives, random access memory (RAM), read-only memory (ROM), programmable read-only memory (PROM), redundant arrays of independent disks (RAID), flash memory, magneto-optical memory, holographic memory, bubble memory, magnetic drum, memory stick, Mylar® tape, smartdisk, thin film memory, zip drive, and so forth.

It should be borne in mind that, although a single memory is described here, the storing function may be performed by more than one memory devices associated with the system for storing image processing routines, input image frames, and so forth.

Referring again to FIG. 2, the image generation system 200 also includes an image processing circuit 260 configured to estimate a scale and orientation of the at least one object 250 in each of the plurality of image frames 220, 230 and 240. In this embodiment, the image processing circuit 260 is configured to identify the at least one object 250 in each of the plurality of image frames 220, 230 and 240 and to divide the identified object into a plurality of object segments. In one embodiment, the object 250 is manually identified by a user of the system 200 using a shape enclosing the object 250. The shape enclosing the object 250 may be a geometric shape such as an ellipse or a rectangle. In another embodiment, the object 250 is automatically identified by the system 200 using an object detection technique.

In certain embodiments, a number and size of the object segments are configurable and may be specified by the user of the system 200. In one embodiment, a size of each object segment is about 35% of the size of the identified object. In this embodiment, width ($W_F$) and height ($H_F$) of each object segment are about 35% of the width ($W_T$) and height ($H_T$) of the identified object respectively.

In certain other embodiments, the plurality of object segments include overlapping segments. In one example embodiment, the center of each object segment is shifted from a center of a neighboring object segment by about half of the width of the corresponding segment in horizontal direction and by about half of the height of the corresponding segment in vertical direction respectively. However, a variety of other patterns may be envisaged for the object segments.

The image processing circuit 260 is configured to model an appearance of each of the plurality of object segments. In one embodiment, the object segments are modeled using a weighted histogram. In another embodiment, the object segments are modeled using an un-weighted histogram.

The image processing circuit 260 includes a plurality of tracking modules such as represented by reference numerals 261 and 262 configured to track a location of the plurality of object segments. Further, the image processing circuit 260 includes a computational module 270 configured to estimate the scale and orientation of the at least one object using the position of each of the plurality of object segments. In this example embodiment, each of the tracking modules 261 and 262 includes a mean shift based tracker. In another example embodiment, each of the tracking modules 261 and 262 includes an integral histogram based tracker.

The tracking modules such as 261 and 262 estimates location of the object segments using a mean shift vector of the respective object segments. In this embodiment, visual features of each object segment are characterized using weighted histograms and the location of the object segments is computed by comparing histograms of successive image frames.

In this example embodiment, the computational module 270 includes a Kalman filter configured to maintain coherence between object segments. The Kalman filter updates the position of each of the object segments based upon an estimated position of the respective object segment in a previous image frame along with the position of neighboring object segments.

In certain embodiments, the Kalman filter is configured to detect outlier and in-lying object segments based upon location of object segments in successive image frames and a pre-determined threshold. In this example embodiment, center and orientation of an object segment is compared with corresponding center and orientation of the object segment in a previous image frame. In one example embodiment, the object segment is identified as an outlier object segment if the center and orientation of an object segment lies outside about 10% of the previous localization.

In another example embodiment, object segments with a similarity coefficient below a pre-determined threshold are identified as outlier object segments. In one embodiment, the pre-determined threshold is about 0.5. In certain embodiments, the image processing circuit 260 is configured to re-initialize the number of object segments if the number of outlier object segments is greater than a pre-determined threshold. In one example embodiment, the pre-determined threshold is about half of the total number of object segments.

The computational module 270 can be configured to fit a blob around the in-lying object segments. In the illustrated embodiment, the output image frames are represented by reference numerals 280, 290 and 300 and the blobs identifying the object 250 are represented by reference numerals 281, 291 and 301 respectively. In this example embodiment, an elliptical blob is generated to obtain the position of the object. However, other bounding shapes may be employed to obtain the position of the object 250.

The computational module 270 computes centralized image moments for the elliptical blob. Further, the centroid and covariance matrix are computed using the centralized image moments. The centroid represents the center of mass of the object 250 and the covariance matrix is representative of the spread of the blob. The scale and orientation of the object 250 are determined using the moments and the covariance matrix.

In certain embodiments, the computational module 270 computes first and second image moments using the center of each of the identified in-lying object segments. Further, a major axis, a minor axis and an orientation angle is determined using the first and second image moments. Subsequently, each of the plurality of object segments is aligned along the orientation angle.

Figure 3:
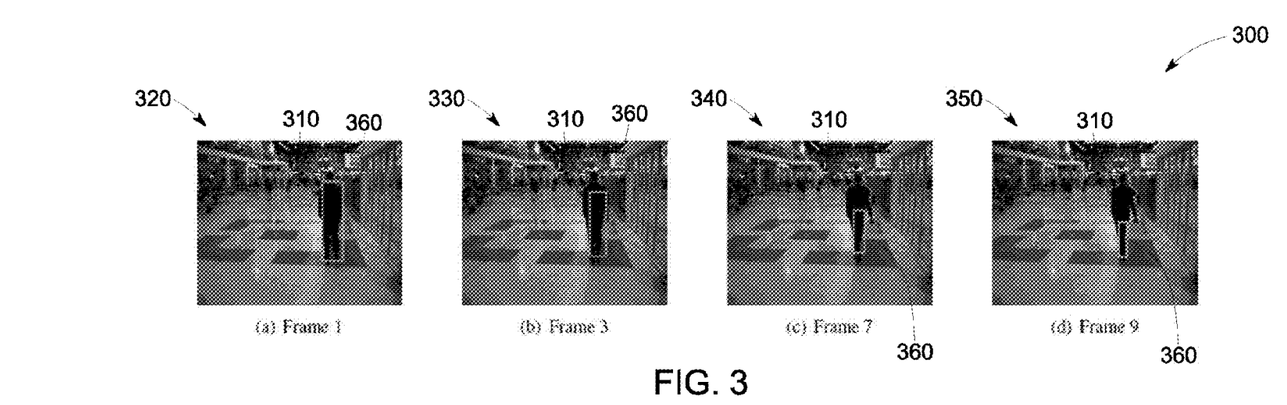
FIG. 3 illustrates example image frames with an object tracked using a traditional mean shift tracker.

FIG. 3 illustrates example image frames 300 with an object 310 tracked using a traditional mean shift tracker. In this embodiment, an individual 310 is tracked while the individual 310 is moving rapidly away from a camera. In this example embodiment, three mean shift trackers are employed for each of image frames 320, 330, 340 and 350. In this embodiment, a first tracker is implemented at the same scale as in a previous image frame while second and third trackers are implemented at 20% increase and 20% decrease in the scale respectively as compared to the previous image frames. As can be seen, a bounding box 360 tracking the individual 310 shrinks to a substantially small box with the change in scale resulting in loss of track of the individual 310.

Figure 4:
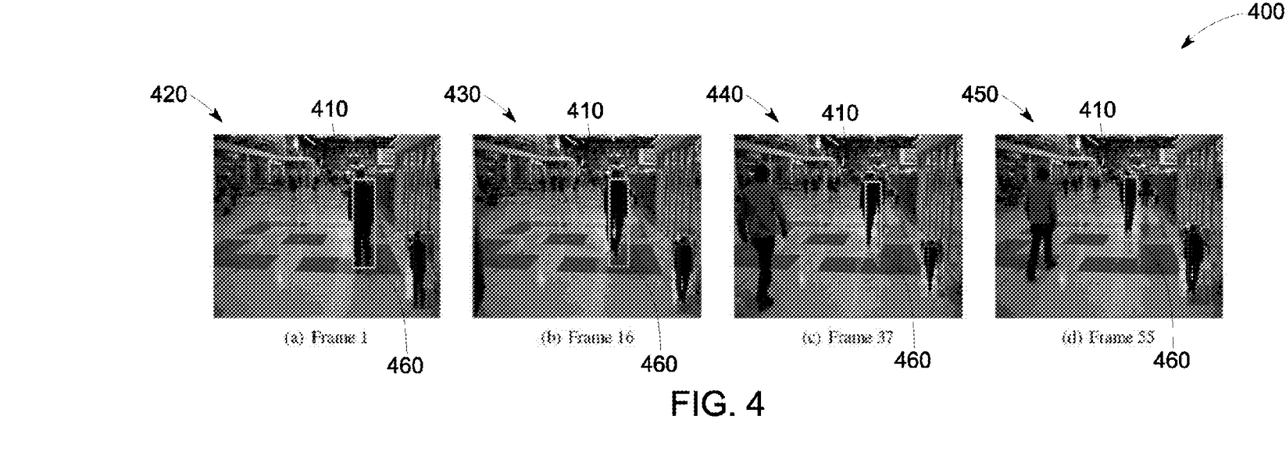
FIG. 4 illustrates example image frames with an object tracked using the object tracking system of FIG. 2.

FIG. 4 illustrates example image frames 400 with an individual 410 tracked using the object tracking system 200 of FIG. 2. As with the embodiment of FIG. 4, the individual 410 is tracked while the individual 410 is moving rapidly away from a camera. In this embodiment, the individual 410 is tracked using a number of object segments where each object segment has a size of about 35% of the size of the object 410. As can be seen through image frames 420, 430, 440 and 450, despite a significant scale change, the tracking system 200 is able to track the individual 410 using a bounding box 460.

The example methods and systems described above facilitate visual tracking of objects undergoing scale and orientation changes. The technique tracks an object by dividing the object into a plurality of object segments and by tracking of each of the object segments to determine the scale and orientation of the object.

The image generation technique described above may be utilized in a variety of applications such as for tracking of objects in computer vision and video analysis. The technique may be utilized in applications such as surveillance and guided weaponry that requires tracking of objects using video/cameras.

As will be appreciated by those of ordinary skill in the art, the foregoing example, demonstrations, and process steps may be implemented by suitable code on a processor-based system. It should also be noted that different implementations of the present technique may perform some or all of the steps described herein in different orders or substantially concurrently, that is, in parallel.

Furthermore, the functions may be implemented in a variety of programming languages, such as C++ or JAVA. Such code, as will be appreciated by those of ordinary skill in the art, may be stored or adapted for storage on one or more tangible, machine readable media, such as on memory chips, local or remote hard disks, optical disks (that is, CDs or DVDs), or other media, which may be accessed by a processor-based system to execute the stored code.

Figure 5:
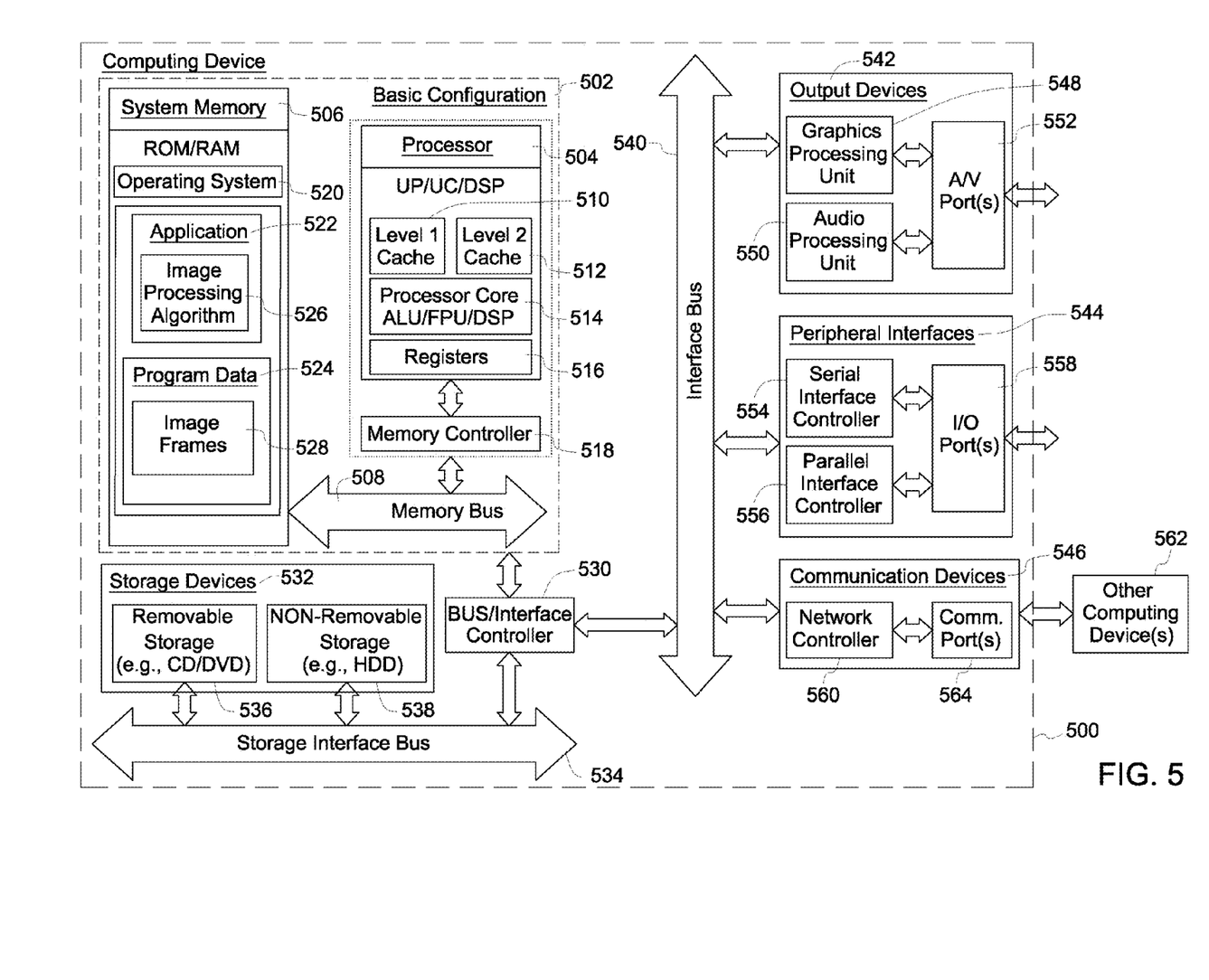
FIG. 5 is a block diagram illustrating an example computing device that is arranged for tracking of visual objects in accordance with the present disclosure.

FIG. 5 is a block diagram illustrating an example computing device 500 that is arranged for tracking of visual objects in accordance with the present disclosure. In a very basic configuration 502, computing device 500 typically includes one or more processors 504 and a system memory 506. A memory bus 508 may be used for communicating between processor 504 and system memory 506.

Depending on the desired configuration, processor 504 may be of any type including but not limited to a microprocessor (µP), a microcontroller (µC), a digital signal processor (DSP), or any combination thereof. Processor 504 may include one more levels of caching, such as a level one cache 510 and a level two cache 512, a processor core 514, and registers 516. An example processor core 514 may include an arithmetic logic unit (ALU), a floating point unit (FPU), a digital signal processing core (DSP Core), or any combination thereof. An example memory controller 518 may also be used with processor 504, or in some implementations memory controller 518 may be an internal part of processor 504.

Depending on the desired configuration, system memory 506 may be of any type including but not limited to volatile memory (such as RAM), non-volatile memory (such as ROM, flash memory, etc.) or any combination thereof. System memory 506 may include an operating system 520, one or more applications 522, and program data 524. Application 522 may include an image processing algorithm 426 that is arranged to perform the functions as described herein including those described with respect to process 100 of FIG. 1. Program data 524 may include image frames 528 that may be useful for tracking the objects therein as is described herein.

In some embodiments, application 522 may be arranged to operate with program data 524 on the operating system 520 such that tracking of objects undergoing scale and orientation changes may be performed. This described basic configuration 502 is illustrated in FIG. 5 by those components within the inner dashed line.

Computing device 500 may have additional features or functionality, and additional interfaces to facilitate communications between basic configuration 502 and any required devices and interfaces. For example, a bus/interface controller 530 may be used to facilitate communications between basic configuration 502 and one or more data storage devices 532 via a storage interface bus 534. Data storage devices 532 may be removable storage devices 536, non-removable storage devices 538, or a combination thereof.

Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 506, removable storage devices 536 and non-removable storage devices 538 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 540 for facilitating communication from various interface devices (e.g., output devices 542, peripheral interfaces 544, and communication devices 546) to basic configuration 502 via bus/interface controller 530. Example output devices 542 include a graphics processing unit 548 and an audio processing unit 550, which may be configured to communicate to various external devices such as a display or speakers via one or more A/V ports 552.

Example peripheral interfaces 544 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal.

By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc.

As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method of tracking an object that appears in a plurality of image frames, comprising:
   (a) dividing an identified object of one of the plurality of image frames into a plurality of object segments;
   (b) tracking a location of each of the plurality of object segments in the image frame;
   (c) estimating at least one of scale and orientation of the object using the location of each of the plurality of object segments; and
   (d) obtaining position of the object using the estimated scale and orientation.

2. The method of claim 1, comprising repeating steps (a)-(d) for each of the plurality of image frames.

3. The method of claim 1, wherein the plurality of object segments comprise overlapping object segments.

4. The method of claim 1,
   wherein each of the plurality of object segments is represented using a histogram; and
   wherein the tracking includes tracking the location of each of the plurality of object segments using a mean shift vector of each of the plurality of object segments.

5. The method of claim 4, wherein the tracking further includes:
   characterizing visual features of each of the plurality of object segments through a statistical distribution in each of first and second image frames;
   computing a similarity coefficient for each of the plurality of object segments based upon the statistical distribution in the first and second image frames; and obtaining the location of each of the plurality of object segments in the second image frame using the corresponding similarity coefficient.

6. The method of claim 5, wherein the visual features comprise a color and/or a texture of the object segment.

7. The method of claim 1, wherein the tracking includes maintaining coherence between adjacent object segments using a Kalman filter, and
wherein each of a state transition matrix and a covariance matrix of the Kalman filter comprises a non diagonal matrix.

8. The method of claim 1, wherein the tracking incldes:
identifying outlier object segments and in-lying object segments based upon the location of object segments in successive image frames and a pre-determined threshold; and
fitting a blob representing the object using the identified in-lying object segments to obtain the position of the object.

9. The method of claim 8, wherein the identifying includes:
comparing similarity coefficient for each of the plurality of object segments with a pre-determined threshold value for identifying outlier object segments; and
re-initializing each of the plurality of object segments if a number of the plurality of outlier object segments having a similarity coefficient below the threshold value for indentifying outlier object segments is greater than the pre-determined threshold value therefore.

10. The method of claim 8, wherein the fitting includes:
computing centralized image moments for the blob representing the object; and
computing a centroid and a covariance matrix using the centralized image moments; and
wherein the estimating includes determining the scale and orientation of the object using the centralized image moments and the covariance matrix.

11. A method of tracking an object that appears in a plurality of image frames, comprising:
identifying the object in one of the plurality of image frames;
dividing the identified object into a plurality of object segments;
estimating a location of each of the plurality of object segments using a mean shift vector of each of the plurality of object segments;
updating the estimated location of each of the plurality of object segments through a Kalman filter; and
estimating at least one of scale and orientation of the object using the updated location of each of the plurality of object segments.

12. The method of claim 11,
wherein each of the plurality of object segments is represented using a histogram; and
wherein the estimating includes tracking the location of each of the plurality of object segments in each of the plurality of image frames by minimizing a distance between histograms of successive image frames.

13. The method of claim 11, wherein the estimating includes:
identifying in-lying object segments based upon an updated location of each of the plurality of object segments in successive frames and a pre-determined threshold; and
fitting a blob using the identified in-lying object segments to obtain the position of the object.

14. The method of claim 13, wherein the fitting includes:
computing first and second image moments using a center of each of the identified in-lying object segments;
determining a major axis, a minor axis and an orientation angle using the first and second image moments; and
aligning each of the plurality of object segments along the orientation angle.

15. A system for tracking an object, comprising:
a memory configured to store a plurality of image frames with at least one object appearing in each of the plurality of image frames;
an image processing circuit configured to estimate a scale and an orientation of the at least one object in each of the plurality of image frames, wherein the image processing circuit comprises:
a plurality of tracking modules configured to track a position of each of a plurality of object segments of the at least one object; and
a computational module configured to estimate the scale and orientation of the at least one object using the position of each of the plurality of object segments.

16. The system of claim 15, wherein the image processing circuit is configured to:
identify the at least one object in each of the plurality of image frames; and
divide the identified object into the plurality of object segments.

17. The system of claim 16, wherein the plurality of object segments comprise overlapping object segments and wherein a size of each of the object segment is about 35% of the size of the at least one object.

18. The system of claim 15, wherein each of the plurality of tracking modules comprises a mean shift based tracker, or an integral histogram based tracker, or combinations thereof.

19. The system of claim 15, wherein the computational module comprises a Kalman filter configured to maintain coherence between adjacent object segments and to detect outlier object segments based upon location of object segments in successive frames and a pre-determined threshold.

20. The system of claim 19, wherein diagonal elements of a state transition matrix of the Kalman filter are assigned a weight (w), wherein diagonal elements of a covariance matrix of the Kalman filter are assigned a weight $(1-w)/(N-1)$ and wherein the weight (w) has a value between 0 and about 1.

* * * * *

UNITED STATES PATENT AND TRADEMARK OFFICE
CERTIFICATE OF CORRECTION

PATENT NO.         : 8,335,348 B2
APPLICATION NO.    : 12/637180
DATED              : December 18, 2012
INVENTOR(S)        : Srikrishnan et al.

It is certified that error appears in the above-identified patent and that said Letters Patent is hereby corrected as shown below:

In the Drawings

In Fig. 5, Sheet 4 of 4, delete "UP/UC/DSP" and insert -- $\mu P/\mu C/DSP$ --, therefor.

In the Specifications

In Column 4, Line 15, delete "w," and insert -- $w_t$ --, therefor.

In the Claims

In Column 11, Line 12, in Claim 8, delete "incldes:" and insert -- includes: --, therefor.

In Column 11, Line 21, in Claim 9, delete "comparing" and insert -- comparing a --, therefor.

In Column 11, Line 27, in Claim 9, delete "indentifying" and insert -- identifying --, therefor.

Signed and Sealed this
Twenty-third Day of April, 2013

Teresa Stanek Rea
*Acting Director of the United States Patent and Trademark Office*